United States Patent [19]
Gaiski

[11] Patent Number: 5,811,737
[45] Date of Patent: Sep. 22, 1998

[54] SOURCE REDUCTION ANALYSIS INTEGRATION OF CHEMICAL PRODUCTS

[76] Inventor: Stephen N. Gaiski, 595 Forest, Suite 1B, Plymouth, Mich. 48170

[21] Appl. No.: 614,239

[22] Filed: Mar. 12, 1996

[51] Int. Cl.$^6$ ............................. G01G 9/00; G01G 19/52; B65B 1/30
[52] U.S. Cl. .................................. 177/1; 177/50; 177/60; 177/245; 141/83
[58] Field of Search ............................. 141/1, 83; 177/1, 177/50, 60, 245

[56] References Cited

U.S. PATENT DOCUMENTS

| | | | |
|---|---|---|---|
| 3,687,209 | 8/1972 | Goldberg et al. | 177/245 |
| 4,002,215 | 1/1977 | Harvill | 177/146 |
| 4,049,083 | 9/1977 | Garvey | 187/9 R |
| 4,245,505 | 1/1981 | Baynes | 177/245 |
| 4,319,612 | 3/1982 | Golding | 141/1 |
| 4,474,255 | 10/1984 | Blok et al. | 177/50 |
| 4,524,617 | 6/1985 | Krehel et al. | 177/245 |
| 5,377,723 | 1/1995 | Hilliard, Jr. et al. | 141/83 |
| 5,634,501 | 6/1997 | Walshe | 141/83 |

OTHER PUBLICATIONS

"US Automotive Pollution Prevention Project", Michigan Department of Enviromental Quality, Jun. 1997.

Primary Examiner—Hezron E. Williams
Assistant Examiner—Randy W. Gibson
Attorney, Agent, or Firm—Charles W. Chandler

[57] ABSTRACT

A source reduction analysis process of integrating scales to minimize chemical product usage. Based on residuals identified by weight measurements, an economic decision is made to reinstate for consumption, recycling or disposal of the product residual.

3 Claims, 1 Drawing Sheet

5,811,737

SOURCE REDUCTION ANALYSIS INTEGRATION OF CHEMICAL PRODUCTS

BACKGROUND-FIELD OF THE INVENTION

This invention relates to a system for minimizing the wastage of chemical products used within manufacturing facilities. This is achieved by weighing the chemical product container after each application.

BACKGROUND OF THE INVENTION

Manufacturers of different industries and finished products utilize a wide range of chemical products on a daily basis for numerous applications. These applications include products such as sealers and adhesives (used within the automotive industry) that are an integral part of the finished product, i.e. the automobile. Other applications use products that do not become part of the finished product, yet, they are integral to industrial operations. These products include polymers used for water treatment applications, and maintenance products used for housekeeping.

Currently, these products are typically supplied in 5 gallon buckets, 15 gallon carboys, 55 gallon drums, totes of various sizes (275 gallons to 600 gallons) and deliveries to bulk containers. These containers may be either returnable or nonreturnable.

Bulk container application of chemical products results in the full use of each product. However, the diversity of manufacturing operations and daily chemical products consumption do not make bulk applications an exclusive option in terms of economics and feasibility. The need still exists within industry for utilizing chemical products that are not supplied in bulk.

Applications in industries that use nonreturnable containers, typically utilize a waste handling firm to ensure residues are removed from the containers prior to disposal.

Industries do use returnable containers, such as buckets, carboys, drums and totes to minimize disposal costs associated with the packaging of the chemical products. Several of these containers have been designed to ensure complete drainage or use of chemical products.

See-through containers are one example. However, industry and government regulations currently permit a residual that may be sent back to the chemical supplier. This results in a residue that is not consumed in the industrial process on a daily basis. If the residue exceeds the legal limit that is allowed to be shipped, the manufacturer disposes of this residue by contacting a waste handling firm.

Totes designed with slanted bottoms to permit complete drainage of products are another example. As with see-through containers, the product is rarely entirely consumed, due to the industry acceptance of a residue being returned to the chemical supplier or by contacting a waste handling firm.

Products and applications exist that do not permit see-through containers or slanted bottoms. These applications usually involve a dense material (paste-like material) that is pumped out under pressure at the industrial application. These applications use a level indicator that correlates with container volumes. However, these indicators may become bent, or uncalibrated during normal plant operations. This results in the removal of the container from the application, before the contents are entirely consumed. Additionally, even if the level indicator is working properly, industry's acceptance of residuals being returned to the chemical supplier or cleaned by a waste handling firm results in wastage.

Consequently, previous attempts at source reduction analysis of chemical residuals left within containers suffer from a number of disadvantages:

(a) Industry accepts a certain residual left in nonreturnable containers. This is due to industry utilizing waste handling firms for cleaning purposes. This results in substantial chemical product wastage and costs.

(b) Industry and existing regulations permit a certain residual left in returnable containers. This results in substantial chemical product wastage and costs.

(c) See-through containers are removed from the application site with product that has not yet been consumed. This is due to industry utilizing waste handling firms for cleaning purposes, prior to shipment back to the chemical supplier.

(d) Containers with slanted bottoms are removed from the application site with product that has not yet been entirely consumed. This is due to industry utilizing waste handling firms for cleaning purposes, prior to shipment back to the chemical supplier.

(e) Level indicators used for measuring paste-like materials often become bent or uncalibrated from plant operations. This results in substantial chemical product wastage and costs.

An example of such waste may be the pounds of underbody sealer that an industrial facility uses on a routine basis. This material currently uses a level indicator to designate when a tote should be replaced. The level indicator, when working properly, designates only 28 lbs. of material remaining in the tote when it should be replaced.

However, data indicates as much as 720 lbs. of wasted material had to be cleaned from a tote, prior to returning. Utilizing a scale to measure the tote, after it is removed from the process, would allow operators to reinstate a partially full tote into the industrial application. This would enhance profitability and minimize usage. During a five week period, an average of $251.83 was actually lost per tote instead of the accepted loss of $33.58. This represents a wastage of $218.25 per tote for 89 totes. Assuming a production year of 45 weeks, $174,818.25 of usable product would not have been consumed, due to the current method of replacing totes.

SUMMARY OF THE INVENTION

The preferred embodiment of this invention uses scales that weigh the residuals in the containers. An economic decision based on the quality of the product residual is then made before the containers are forwarded for either disposal, cleaning or return to the chemical product supplier. This decision permits the manufacturing facility three options:

1) Reinstate container back into the application process. This permits appropriate product consumption thereby reducing product costs.

2) Return unused material to the chemical supplier for appropriate credit and/or recycling.

3) Forward the container for either disposal, cleaning or return to the chemical product supplier.

Accordingly, several objects and advantages of the present invention are:

(a) to incorporate into the manufacturing facility, a process that weighs product residuals in nonreturnable containers;

(b) to incorporate into the manufacturing facility, a process that weighs product residuals in see-through containers;

(c) to incorporate into the manufacturing facility, a process that weighs product residuals in returnable containers;

(d) to incorporate into the manufacturing facility, a process that weighs product residuals of containers with slanted bottoms;

(e) to incorporate into the manufacturing facility, a process that utilizes scales for increasing profitability, by minimizing product wastage;

(f) to incorporate into the manufacturing facility, a process that utilizes scales for enhancing recycling of chemical products;

(g) to incorporate into the manufacturing facility, a process that utilizes scales for minimizing the amount of waste, that must be disposed on an ongoing basis.

From the above description, a number of advantages of integrating the use of scales become evident:

(a) Product residuals can be identified with actual measurement. This allows for reinstating the product, if residuals are too excessive.

(b) Profitability is enhanced by consuming a greater portion of the material that was ordered by the facility.

(c) Waste handling firms' costs will decrease; as there is less chemical product waste that requires handling.

(d) Waste disposal and waste transportation costs will decrease; due to the reduction of chemical product wastes.

(e) Less waste will be forwarded to a landfill, as a result of integrating scales.

(f) Greater recycling of product residuals will occur, as the excess residuals will be returned to the product supplier for credit.

(g) Less raw materials will be consumed in manufacturing chemical products, as the amount of product shipped to an industrial plant will decrease, based on the current excessive wastage of container residuals.

Still further objects and advantages of the invention, will become readily apparent to those skilled in the art to which the invention pertains upon reference to the following detailed description.

DESCRIPTION OF THE DRAWINGS

The description refers to the accompanying drawing illustrating an industrial process with a scale system for weighing a partially used drum of a pourable industrial product.

DESCRIPTION OF THE PREFERRED EMBODIMENT

Figure 1:
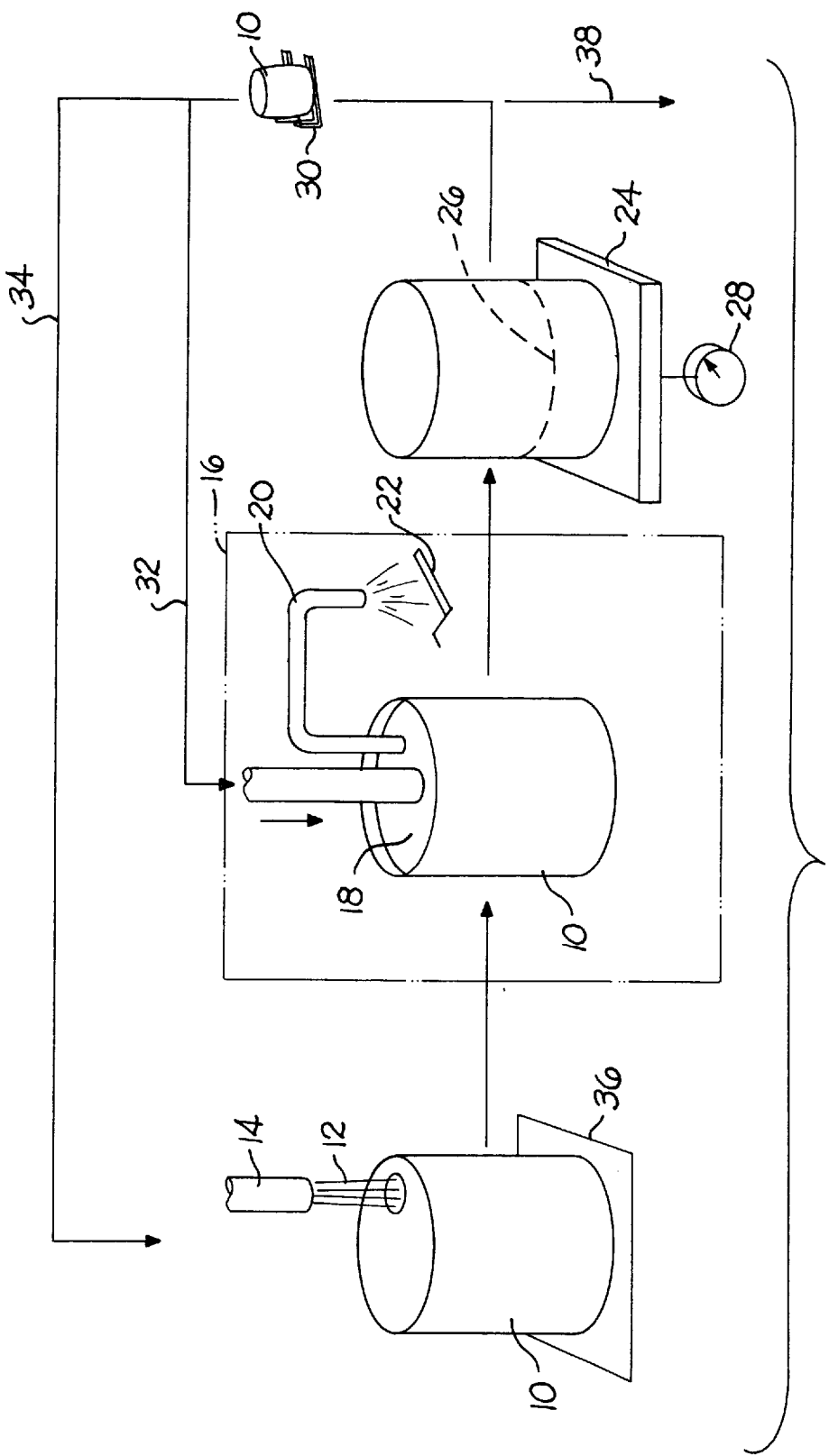

Referring to the drawing, a 55 gallon drum 10 is filled with 480 lbs. of a pourable industrial paste 12 from any suitable source 14. Paste 12 is a urethane adhesive which normally substantially cures when exposed to air, or another pourable industrial product such as underbody sealer and the like. Drum 10 is filled at the site of a supplier of an industrial process and is then delivered to industrial site 16 which may be at another plant. Typically, drum 10 has a removeable top. A plunger 18 is depressed into the drum with its top removed which causes paste 12 to discharge through a suitable tubular nozzle means 20 onto a surface 22 which may be a fabricated product that is to use the adhesive.

Plunger 18 is withdrawn when the drum has been partially emptied leaving a paste residue. The drum is then delivered to a scale 24. The level 26 of the residue in the drum may be either above or below an acceptable loss such as 28 lbs. of material. The dial indicates on scale 28 the actual weight of the drum, 40 lbs., plus the residue material.

If the actual weight of the residual paste 28 lbs. indicating that an insufficient amount of paste has been removed from the drum, then the drum is returned by a fork lift means 30 along a route 32 to the industrial process and the plunger reinserted to remove more paste from the drum. If on the other hand the weight of the residual paste is 28 lbs. or less, the drum is economically empty and the drum is then returned by any suitable transport means along a route 34 to the original filling station 36 which either may be within the plant or in another plant, or else the drum is forwarded for disposal.

Optionally, in some cases the drum may be delivered along an alternative route 38 because of its damaged condition, cleaned of the residual paste and then trashed.

Accordingly, the integration of the use of scales to reinstate chemical products at each application of this invention, will allow manufacturers who are using chemical products to enhance profitability. This allows the manufacturers the opportunity to purchase less chemical products. Furthermore, the integration of scales to reinstate chemical products at different applications, has the additional advantages in that:

(a) the manufacturing facility can report less product consumed per production rate for environmental purposes;

(b) the manufacturing facility can report less waste generated per production rate for environmental purposes;

(c) the manufacturing facility can report more product offered for recycling per production rate for environmental purposes;

(d) the manufacturing facility will be able to reduce their costs associated with waste handling firms;

(e) the manufacturing facility will be able to reduce their costs associated with waste disposal and transportation;

(f) the manufacturing facility will generate less waste per production rate for environmental purposes;

(g) the manufacturing facility will be able to inventory less chemical products on site, thereby reducing costs associated with inventory.

Although the description above contains many specifications, these should not be construed as limiting the scope of this invention but as merely providing illustrations of some of the presently preferred embodiments of this invention. For example, the use of scales to reinstate chemical products within applications may provide data for cost analysis and corrective action reports.

Thus it is to be understood that I have described a system for reducing waste in an industrial process that uses totes or containers of a pourable material by weighing the container, such as a drum, a tote or other container, and the residue material at the end of the industrial process to determine the quantity of material remaining in the container and then delivering it to a destination that depends upon whether or not the weight of the container exceeds or does not exceed a predetermined standard.

Having described my invention I claim:

1. A method for routing a container of a pourable industrial product, comprising the steps of:

filling a container with the pourable industrial product;

mechanically dispensing a portion of the contents of the container in an industrial process that applies the industrial product on the surface of a workpiece;

delivering the partially empty container from the location of the industrial process to a weighing scale;

weighing the partially empty container to determine the actual weight thereof;

returning the container to the industrial process by a mechanical transport means, for further dispensation of the contents thereof if the actual weight is more than the standard weight, or, routing the container to a destination other than the industrial process by a mechanical transport means, if the actual weight is less than the standard weight.

2. A method as defined in claim 1, including the step of cleaning and refilling the container at a destination other than the site of the industrial process.

3. A method as defined in claim 1, in which the container is partially full of the pourable industrial product, and including the step of refilling the partially full container and then returning the full container to the industrial process site.

* * * * *